US012279091B2

(12) United States Patent
Elmedyb et al.

(10) Patent No.: US 12,279,091 B2
(45) Date of Patent: Apr. 15, 2025

(54) HEARING AID AND A METHOD OF OPERATING A HEARING AID

(71) Applicant: WIDEX A/S, Lynge (DK)

(72) Inventors: Thomas Bo Elmedyb, Herlev (DK); Lars Dalskov Mosgaard, Copenhagen (DK); Rasmus Bendtsen, Broenshoej (DK); Jannik Andersen, Roedovre (DK); Benjamin Dieudonné, Leuven (BE); Peter Wahrman, Birkeroed (DK); Niels Jensen, Skovlunde (DK); Eghart Fischer, Schwabach (DE)

(73) Assignee: WIDEX A/S, Lynge (DK)

( * ) Notice: Subject to any disclaimer, the term of this patent is extended or adjusted under 35 U.S.C. 154(b) by 0 days.

(21) Appl. No.: 18/615,941

(22) Filed: Mar. 25, 2024

(65) Prior Publication Data

US 2024/0244382 A1 Jul. 18, 2024

Related U.S. Application Data

(63) Continuation-in-part of application No. 17/782,288, filed as application No. PCT/EP2020/084651 on Dec. 4, 2020, now Pat. No. 11,968,499.

(30) Foreign Application Priority Data

Dec. 4, 2019 (DK) ............................ PA201901425

(51) Int. Cl.

| | |
|---|---|
| ***H04R 25/00*** | (2006.01) |
| ***H04R 1/40*** | (2006.01) |
| ***H04R 3/00*** | (2006.01) |

(52) U.S. Cl.

CPC ........... *H04R 25/407* (2013.01); *H04R 1/406* (2013.01); *H04R 3/005* (2013.01); *H04R 25/43* (2013.01); *H04R 25/505* (2013.01); *H04R 2201/40* (2013.01); *H04R 2225/41* (2013.01); *H04R 2430/03* (2013.01)

(58) Field of Classification Search

CPC ...... H04R 1/406; H04R 3/005; H04R 25/407; H04R 25/43; H04R 25/505; H04R 2201/40; H04R 2225/41; H04R 2430/03

See application file for complete search history.

(56) References Cited

U.S. PATENT DOCUMENTS

| | | | | |
|---|---|---|---|---|
| 5,473,701 | A | 12/1995 | Cezanne et al. | |
| 6,704,422 | B1 * | 3/2004 | Jensen ................. | H04R 25/502 381/313 |
| 7,010,134 | B2 | 3/2006 | Jensen | |
| 7,933,423 | B2 * | 4/2011 | Baekgaard Jensen ........................ | H04R 25/407 381/313 |

(Continued)

FOREIGN PATENT DOCUMENTS

| | | | |
|---|---|---|---|
| EP | 3 506 658 | A1 | 7/2019 |
| WO | 2019/122284 | A1 | 6/2019 |
| WO | 2019/211187 | A1 | 11/2019 |

OTHER PUBLICATIONS

International Search Report for PCT/EP2020/084651 dated Feb. 16, 2021.

(Continued)

*Primary Examiner* — Huyen D Le

(74) *Attorney, Agent, or Firm* — Sughrue Mion, PLLC

(57) ABSTRACT

A hearing aid with a low-latency filter and a method of operating such a hearing aid (500).

17 Claims, 5 Drawing Sheets

(56) References Cited

U.S. PATENT DOCUMENTS

| | | | |
|---|---|---|---|
| 2007/0206824 | A1 | 9/2007 | Hellgren et al. |
| 2007/0217629 | A1 | 9/2007 | Zhang et al. |
| 2008/0253596 | A1 | 10/2008 | Klinkby et al. |
| 2008/0298615 | A1 | 12/2008 | Klinkby et al. |
| 2013/0336507 | A1 | 12/2013 | Gran |
| 2019/0394576 | A1 * | 12/2019 | Petersen .............. H04R 25/453 |
| 2021/0274295 | A1 | 9/2021 | Elmedyb et al. |

OTHER PUBLICATIONS

Written Opinion for PCT/EP2020/084651 dated Feb. 16, 2021.
Danish first technical examination for PA 2019 01425 dated Apr. 14, 2020.

* cited by examiner

HEARING AID AND A METHOD OF OPERATING A HEARING AID

CROSS-REFERENCE TO RELATED APPLICATIONS

This is a Continuation-In-Part of U.S. patent application Ser. No. 17/782,288, filed Jun. 3, 2022 (allowed), which is a National Stage of International Application No. PCT/EP2020/084651 filed Dec. 4, 2020, claiming priority based on Danish Patent Application No. PA201901425 filed Dec. 4, 2019. The entire disclosures of the prior applications are considered part of the disclosure and are hereby incorporated by reference.

FIELD OF THE INVENTION

The present invention relates to a hearing aid comprising a low delay beamformer and a method of operating such a hearing aid.

BACKGROUND OF THE INVENTION

Generally, a hearing aid system according to the invention is understood as meaning any device which provides an output signal that can be perceived as an acoustic signal by a user or contributes to providing such an output signal, and which has means which are customized to compensate for an individual hearing loss of the user or contribute to compensating for the hearing loss of the user. They are, in particular, hearing aids which can be worn on the body or by the ear, in particular on or in the ear, and which can be fully or partially implanted. However, some devices whose main aim is not to compensate for a hearing loss, may also be regarded as hearing aid systems, for example consumer electronic devices (televisions, hi-fi systems, mobile phones, MP3 players etc.) provided they have, however, measures for compensating for an individual hearing loss.

Within the present context a traditional hearing aid can be understood as a small, battery-powered, microelectronic device designed to be worn behind or in the human ear by a hearing-impaired user. Prior to use, the hearing aid is adjusted by a hearing aid fitter according to a prescription. The prescription is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit. A hearing aid comprises one or more microphones, a battery, a microelectronic circuit comprising a signal processor, and an acoustic output transducer. The signal processor is preferably a digital signal processor. The hearing aid is enclosed in a casing suitable for fitting behind or in a human ear.

Within the present context a hearing aid system may comprise a single hearing aid (a so called monaural hearing aid system) or comprise two hearing aids, one for each ear of the hearing aid user (a so called binaural hearing aid system). Furthermore, the hearing aid system may comprise an external device, such as a smart phone having software applications adapted to interact with other devices of the hearing aid system. Thus, within the present context the term "hearing aid system device" may denote a hearing aid or an external device.

The mechanical design has developed into a number of general categories. As the name suggests, Behind-The-Ear (BTE) hearing aids are worn behind the ear. To be more precise, an electronics unit comprising a housing containing the major electronics parts thereof is worn behind the ear. An earpiece for emitting sound to the hearing aid user is worn in the ear, e.g. in the concha or the ear canal. In a traditional BTE hearing aid, a sound tube is used to convey sound from the output transducer, which in hearing aid terminology is normally referred to as the receiver, located in the housing of the electronics unit and to the ear canal. In some modern types of hearing aids, a conducting member comprising electrical conductors conveys an electric signal from the housing and to a receiver placed in the earpiece in the ear. Such hearing aids are commonly referred to as Receiver-In-The-Ear (RITE) hearing aids. In a specific type of RITE hearing aids the receiver is placed inside the ear canal. This category is sometimes referred to as Receiver-In-Canal (RIC) hearing aids.

In-The-Ear (ITE) hearing aids are designed for arrangement in the ear, normally in the funnel-shaped outer part of the ear canal. In a specific type of ITE hearing aids the hearing aid is placed substantially inside the ear canal. This category is sometimes referred to as Completely-In-Canal (CIC) hearing aids. This type of hearing aid requires an especially compact design in order to allow it to be arranged in the ear canal, while accommodating the components necessary for operation of the hearing aid.

Hearing loss of a hearing impaired person is quite often frequency dependent. This means that the hearing loss of the person varies depending on the frequency. Therefore, when compensating for hearing losses, it can be advantageous to utilize frequency-dependent amplification. Hearing aids therefore often provide to split an input sound signal received by an input transducer of the hearing aid into various frequency intervals, also called frequency bands, which are independently processed. In this way, it is possible to adjust the input sound signal of each frequency band individually to account for the hearing loss in respective frequency bands. The frequency dependent adjustment is normally done by implementing a band split filter and compressors for each of the frequency bands, so-called band split compressors, which may be summarized to a multi-band compressor. In this way, it is possible to adjust the gain individually in each frequency band depending on the hearing loss as well as the input level of the input sound signal in a specific frequency range. For example, a band split compressor may provide a higher gain for a soft sound than for a loud sound in its frequency band.

The filter banks used in such multi-band compressors are well known within the art of hearing aids but are nevertheless based on a number of tradeoffs. Most of these tradeoffs deal with the frequency resolution as will be further described below.

There are some very clear advantages of having a high-resolution filter bank. The higher the frequency resolution, the better individual periodic components can be distinguished from each other. This gives a much finer signal analysis and enables more advanced signal processing. Especially noise reduction and speech enhancement schemes may benefit from a higher frequency resolution.

However, a filter bank with a high frequency resolution generally introduces a correspondingly long delay, which for most people will have a detrimental effect on the perceived sound quality.

It has therefore been suggested to reduce the delay incurred by filter banks, such as Discrete Fourier Transform (DFT), Finite Impulse Response (FIR) or Infinite Impulse Response (IIR) filter banks, by applying a broadband time-varying filter with a response that corresponds to the frequency dependent target gains that were otherwise to be applied to the frequency bands provided by the filter banks. A broadband time-varying filter, such as the one discussed above, will also inherently introduce a delay but this delay is generally significantly shorter than the delay introduced by filter banks.

However, this solution still requires that the frequency dependent gains are calculated in an analysis part of the system, and in case the analysis part comprises filter banks, then the determined frequency dependent gains will be correspondingly delayed relative to the signal that the gains are to be applied to using the time-varying filter, but this is generally considered a minor issue because the frequency dependent gains for most situations need not change very fast.

It has furthermore been suggested in the art to minimize the delay introduced by the time-varying filter by implementing the time-varying filter as minimum-phase.

In the present context only monaural beam forming (as opposed to binaural beam forming) will be considered unless specifically noted otherwise. This type of beam forming applies more than one microphone in a hearing aid and represents a type of noise reduction. Generally, it provides the most significant improvement of speech intelligibility among all types of noise reduction. Additionally, beam forming can help restore pinna cues (i.e. spatial cues) lost by behind the ear hearing aids, which is essential for spatial perception of the wearer especially in order to avoid front-back confusion.

However, a beam former needs to meet some rather strict requirements in order to be suitable for implementation in a low delay system. Among these are a maximum allowed delay in the range of 0.1 milliseconds (including microphone matching), which means that classic beam former designs are not an option. Especially, multiband and binaural beam formers introduce much larger delays.

The document U.S. Pat. No. 5,473,701 describes an adaptive microphone array, in particular a combination of an omnidirectional sensor and a dipole sensor to form an adaptive first order differential microphone array. However, the document is silent with respect to means for providing low delay processing.

It is therefore a feature of the present invention to provide an improved hearing aid with beamforming and low delay signal processing.

It is another feature of the present invention to provide an improved method of operating a hearing aid.

SUMMARY OF THE INVENTION

The invention, in a first aspect, provides a hearing aid comprising at least two microphones, a signal processor, a combiner, a minimum phase filter and an electrical-acoustical output receiver, wherein the hearing aid is adapted to:

- provide a first signal by adding a first and a second microphone signal provided from the first and the second microphones respectively;
- provide a second signal that is different from the first signal by combining a third and a fourth microphone signal provided from the first and the second microphones respectively;
- use the digital signal processor to provide an intermediate beamformed signal by linearly combining, in the combiner, said first and second signals using an adaptive parameter to weight said first and second signals;
- use the digital signal processor to determine a target gain adapted to provide at least one of: alleviating a hearing deficit of a user, suppressing noise and customizing the sound to at least one of a user preference and a sound environment;
- use the digital signal processor to determine a resulting hearing aid gain to be applied to the intermediate beamformed signal based on the target gain and based on the value of the adaptive parameter;
- use the digital signal processor to synthesize the minimum phase filter to apply said resulting hearing aid gain to said intermediate beamformed signal in order to provide a hearing aid output signal as input to the electrical-acoustical output receiver.

The invention, in a second aspect, provides a method of operating a binaural hearing aid, comprising the steps of:

- providing a first signal by adding a first and a second microphone signal provided from the first and the second microphones respectively;
- providing a second signal that is different from the first signal by combining a third and a fourth microphone signal provided from the first and the second microphones respectively;
- using the digital signal processor to provide an intermediate beamformed signal by linearly combining said first and second signals using an adaptive parameter to weight said first and second signals;
- using the digital signal processor to determine a target gain adapted to provide at least one of: alleviating a hearing deficit of a user, suppressing noise and customizing the sound to at least one of a user preference and a sound environment;
- using the digital signal processor to determine a resulting hearing aid gain to be applied to the intermediate beamformed signal based on the target gain and based on the value of the adaptive parameter;
- using the digital signal processor to synthesize the minimum phase filter to apply said resulting hearing aid gain to said intermediate beamformed signal in order to provide a hearing aid output signal as input to the electrical-acoustical output receiver.

Further advantageous features are defined in the dependent claims.

Still other features of the present invention will become apparent to those skilled in the art from the following description wherein the invention will be explained in more detail.

BRIEF DESCRIPTION OF THE DRAWINGS

By way of example, there is shown and described a preferred embodiment of this invention. As will be realized, the invention is capable of other embodiments, and its several details are capable of modification in various, obvious aspects, all without departing from the invention. Accordingly, the drawings and descriptions will be regarded as illustrative in nature and not as restrictive. In the drawings.

DETAILED DESCRIPTION

In the present context the term signal processing is to be understood as any type of hearing aid related signal processing that includes at least: noise reduction (including beam forming), speech enhancement and hearing compensation.

In the present context the term omnidirectional signal is to be understood as a signal that represents a situation where the relative sensitivity of the signal, with respect to impinging sound from all directions from 0° to 360° is the same.

As opposed hereto, the term directional signal represents all other situations. Thus, signals representing a situation where said relative sensitivity has e.g. a sub-cardioid shape, a cardioid shape, a super-cardioid shape, a hyper-cardioid shape or a bidirectional shape may in the following all be denoted a directional signal.

In the present context the term microphone signals may also be used to denote a microphone signal whereto an artificial delay has been applied.

However, if two (or more) microphone signals are added (with an inherent sound transmission time delay between them due to the spacing between the microphones), in order to provide an average of the at least two signals, then this average will still be considered an omnidirectional signal in the present context. This is likewise so if an artificial delay is added to at least one of said at least two microphone signals in order to avoid a dip in the frontal sensitivity in the high frequency range of the resulting omnidirectional signal due destructive interference between at least two of the microphone signals.

Figure 1:
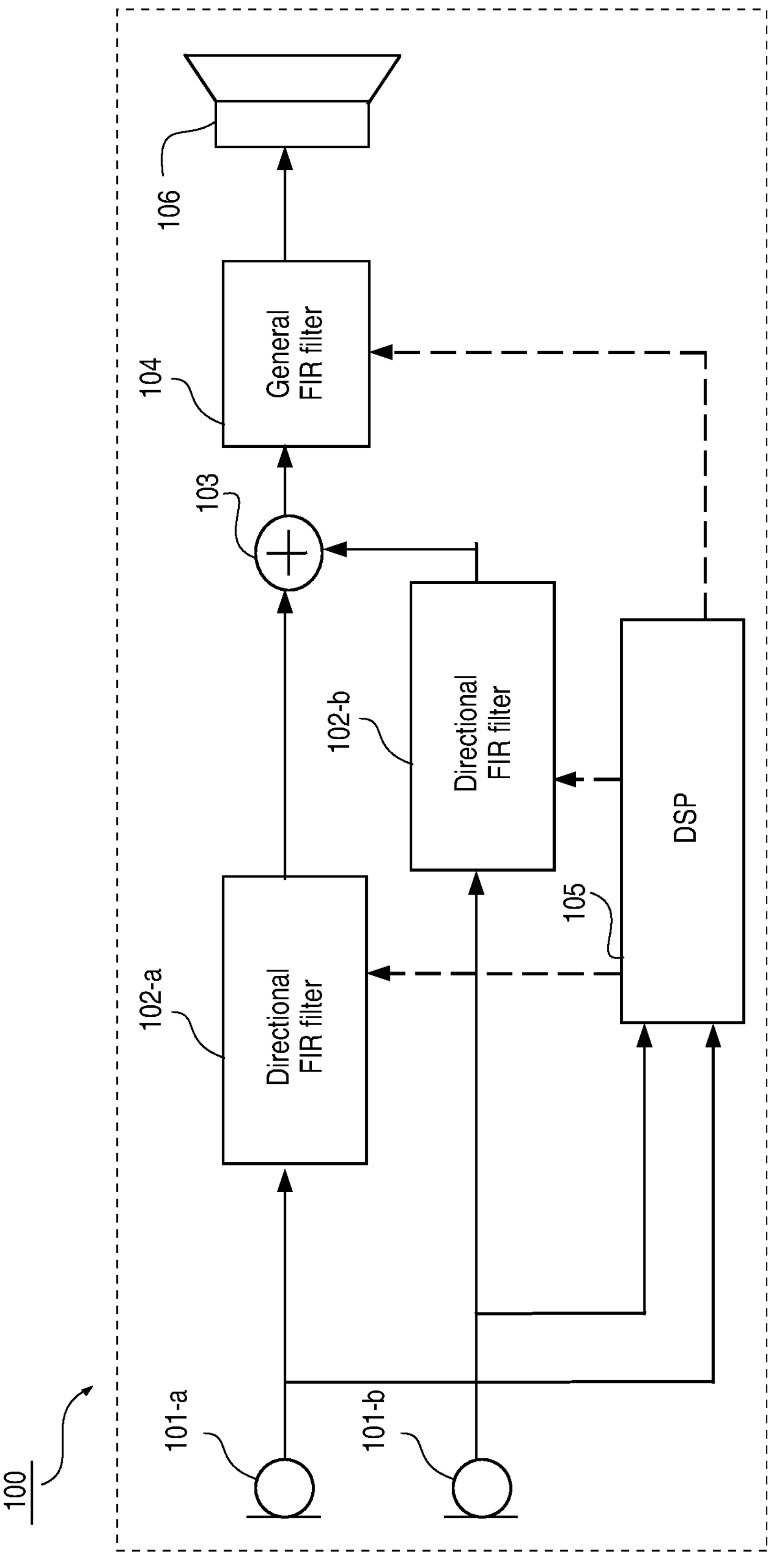
FIG. 1 illustrates highly schematically a hearing aid according to the prior art.

Reference is first made to FIG. 1, which illustrates highly schematically a hearing aid 100 according to the prior art. The hearing aid 100 comprises two acoustical-electrical input transducers 101-*a* and 101-*b*, (i.e. microphones), two serially connected digital Finite Impulse Response (FIR) filters 102-*a* and 102-*b* (which in the following may be denoted Directional FIR filters to emphasize a characteristic of their functionality), a (signal) combiner 103, a general FIR filter 104, a digital signal processor (DSP) 105 and an electrical-acoustical output transducer 106. It is noted that analogue to digital converters (ADCs) are omitted from FIG. 1 for reasons of clarity.

In the hearing aid 100 of FIG. 1 input signal samples from the microphones 101-*a* and 101-*b* are provided to the respective directional FIR filters 102-*a* and 102-*b* and the input signal samples are also provided from the microphones 101-*a*, 101-*b* and to the digital signal processor (DSP) 105 that is adapted to determine a desired frequency dependent target gain, based on the received input signal samples and adapted to calculate weights for the two directional FIR filters 102-*a* and 102-*b* as well as weights to the general FIR filter 104 such that the desired frequency dependent target gain is achieved. The weights provided to the directional FIR filters 102-*a* and 102-*b* and to the general FIR filter 104 are indicated with stipulated lines in order to improve figure clarity by distinguishing between these control signals and the signals that represent the input to and output from the directional FIR filters 102-*a*, 102-*b* and from the general FIR filter 104. The output signals from the directional FIR filters 102-*a*, 102-*b* are combined in the signal combiner 103 whereby a linear combination of the two output signals is provided such that a beamformed signal is obtained and provided to the general FIR filter 104 that provides the final output signal to the electrical-acoustical output transducer 106.

Figure 2:
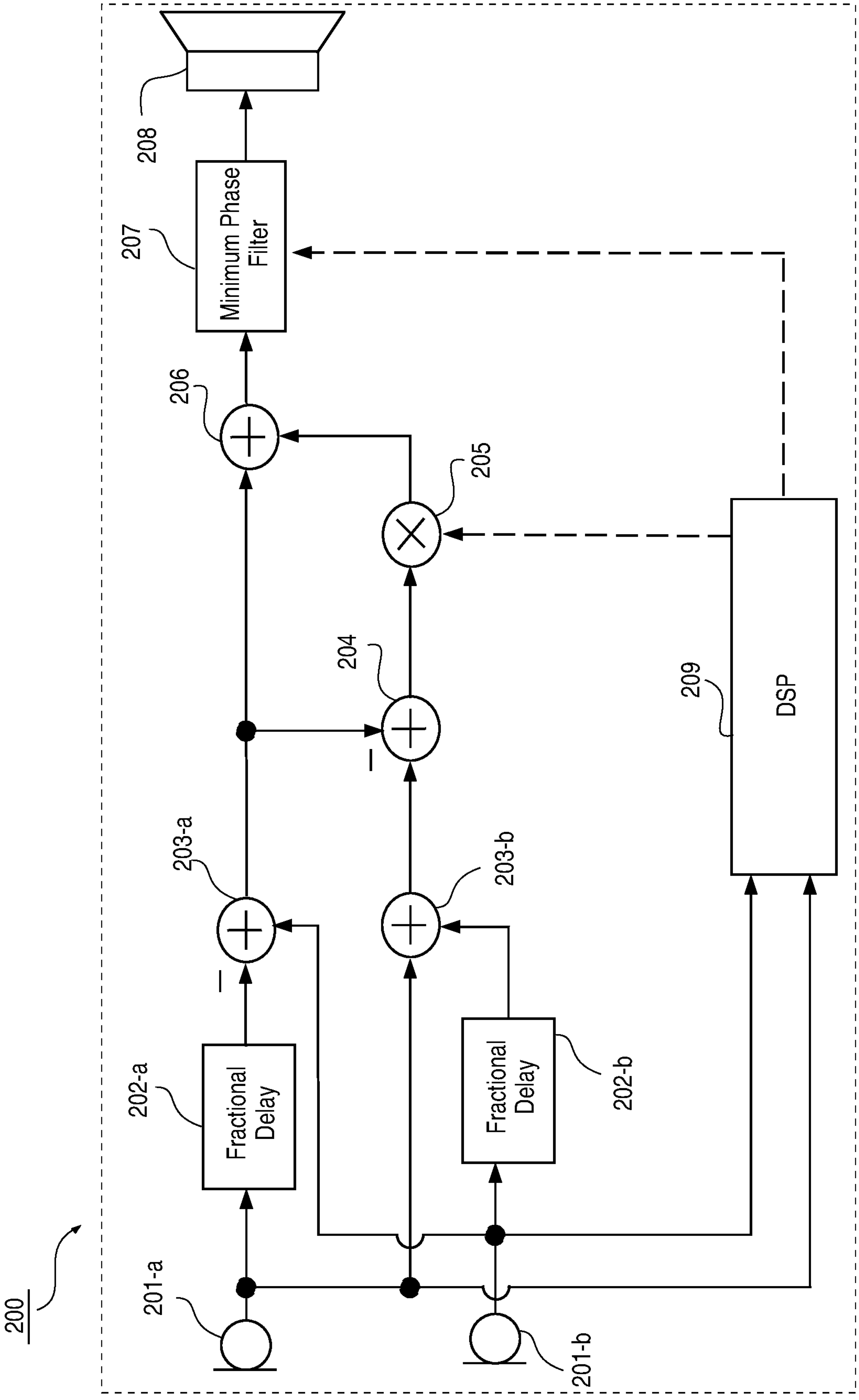
FIG. 2 illustrates highly schematically a hearing aid according to an embodiment of the invention.

Reference is now made to FIG. 2, which illustrates highly schematically a hearing aid 200 according to an embodiment of the invention in which low delay beam forming is based on an adaptive linear combination of an omnidirectional signal and a directional signal.

The hearing aid 200 of FIG. 2 comprises two acoustical-electrical input transducers, i.e. a first microphone 201-*a* (which in the following may be denoted the rear microphone) and a second microphone 201-*b* (which in the following may be denoted the front microphone); delay units 202-*a*, 202-*b*; combiners 203-*a*, 203-*b*, 204 and 206; a multiplier 205; a minimum phase filter 207, a digital signal processor (DSP) 209 and an electrical-acoustical output transducer, i.e. a loudspeaker 208.

According to the embodiment of FIG. 2, the microphones 201-*a*, 201-*b* each provides an analog input signal that is converted into a digital input signal by an analogue to digital converter (ADC) that is omitted from FIG. 2 for reasons of clarity. However, in the following, the term digital input signal may be used interchangeably with the term input signal and the same is true for all other signals referred to in that they may or may not be specifically denoted as digital signals.

According to the embodiment of FIG. 2 both microphones 201-*a* and 201-*b* have an omnidirectional characteristic, however in variations at least one of the microphones may have another characteristic. The microphones are arranged as a front and as a rear microphone, but other arrangements are conceivable. The hearing aid 200 may also have more than two microphones with appropriate combinations of their characteristics.

For the purpose of beamforming, the output signals from the microphones 201-*a* and 201-*b* (which in the following may be denoted microphone signals) are preferably matched in-situ (i.e. adaptive matching carried out during normal operation) (not illustrated in FIG. 2 though). However, the requirement of minimal delay in the signal path generally limits the available matching options and it is therefore preferred that only broadband gain matching (i.e. matching that does not require filter banks) is carried out. Additionally, pre-matched microphones may be used with the benefit of providing closer phase matched microphones either as an alternative to—or together with in-situ matching.

The two microphone signals are branched and each microphone signal is hereby provided both to the input of one of the delay units 202-*a*, 202-*b* which provide a fractional time delay to the respective microphone signal as well as provided to one of the combiners 203-*a* and 203-*b*. The delays influence the directional characteristics of the signals that are provided as output from the combiners 203-*a* and 203-*b*, which signals in the following may be denoted omnidirectional signal and directional signal respectively. It is noted that the impact from the selected delay on the directional characteristic depends on the distance between the two microphones 201-*a*, 201-*b*.

According to the present embodiment both the front and the rear microphone signals are delayed.

The delaying of the front microphone signal in delay unit 202-*b* is done in order to avoid that the sensitivity of the omnidirectional signal, for at least some impinging sound directions, decreases in parts of the higher frequency range (due to destructive interference). Furthermore, careful selection of the applied delay to the front microphone signal can provide that, in addition to alleviating the sensitivity loss for high frequency sounds impinging from the front hemi-sphere, then the sensitivity for high frequency sounds impinging from the back hemi-sphere may be attenuated. Such a difference in front-back sensitivity is very advantageous because this type of spatial cue can be used to avoid the so called front-back confusion, that may result for users with hearing aids that are not able to take advantage of the natural pinna-effect. Finally, it is generally advantageous to be able to provide an omnidirectional signal capable of suppressing high frequency sound from the back hemi-sphere.

According to the present embodiment the delay applied by the delay unit 202-*b* corresponds to approximately ⅔ of the time required for sound to travel the distance between the front and rear microphones (which in the following may also be denoted the acoustic microphone distance), which accounts to approximately 0.03 milliseconds for a distance of 1.5 cm, and according to variations the delay may be in the range between say 0.01 and 0.05 milliseconds dependent on the distance between the front and rear microphone. In other words, the delay applied by the delay unit 202-*b* may be anything between zero and the full acoustic microphone distance.

The delaying of the rear microphone signal in delay unit 202-*a* is done in order to ensure that the directional signal as output from the combiner 203-*a* has a desired directional pattern (e.g. with respect to avoiding front-back confusion) such as a hyper-cardioid instead of e.g. a bidirectional shape, because the broadband mixing carried out by the combiners 204 and 206 and the multiplier 205 only allows an effective mixing of the omnidirectional and directional signals in a relatively narrow frequency range and consequently outside this narrow range either the shape of the omnidirectional or directional signal, as output from the combiners 203-*a* and 203-*b* will dominate and therefore need to have desirable shapes also without an effective mixing.

According to the present embodiment the delay applied by the delay unit 202-*a* also corresponds to approximately ⅔ of the time required for sound to travel the distance between the front and rear microphones, which accounts to approximately 0.03 milliseconds for a distance of 1.5 cm and which provides a hyper-cardioid. However, according to variations the delay may be in the range between say no delay and up to 0.05 milliseconds dependent on the distance between the front and the rear microphone. In other words, the delay applied by the delay unit 202-*b* may also be anything between zero and the full acoustic microphone distance.

Thus according to the present embodiment the omnidirectional signal (which in the following may be abbreviated "omni") is provided as the output signal from the combiner 203-*b* by adding the signal from the rear microphone (201-*a*) with the signal from the front microphone (201-*b*). In the following these two signals may be denoted $x_{rear}$ and $x_{front}$ respectively. Hereby the omnidirectional signal can be expressed as given below in equation (1):

$$\text{omni}=(x_{front}(t+\tau_{front})+x_{rear}(t)) \quad (1)$$

wherein $\tau_{front}$ represents the delay introduced by the delay unit 202-*b*.

In a similar manner the directional signal (which in the following may be abbreviated "dir") is provided as the output signal from the combiner 203-*a* by subtracting the signal from the rear microphone (201-*a*) from the signal from the front microphone (201-*b*). Hereby the directional signal can be expressed as given below in equation (2):

$$\text{dir}=(x_{front}(t)-x_{rear}(t+\tau_{rear})) \quad (2)$$

wherein $\tau_{rear}$ represents the delay introduced by the delay unit 202-*a*.

In continuation of the above an intermediate beamformed signal (which in the following may be abbreviated iBF or simply be denoted beamformed signal), is finally provided by linearly combining the omnidirectional signal and the bidirectional signal as given below in equation (3):

$$\text{iBF}=\gamma*\text{omni}+(1-\gamma)*\text{dir} \quad (3)$$

wherein γ (gamma) is an adaptive parameter, whose selected value controls the shape of the directional pattern for the beamformed signal. More specifically the selected value of γ is used to control whether the hearing aid output signal, in a given frequency range, is primarily omnidirectional or primarily directional and as such may also be used to fade between these omnidirectional and directional characteristics as a function of frequency.

The value of the gamma parameter is determined by the digital signal processor (DSP) 209.

According to the present embodiment the gamma parameter is restricted to be within the range of one and zero, but in variations other ranges may be considered. If a gamma value of one is selected (i.e. first extreme or first endpoint of the range of gamma values) then a hearing aid output signal that has an omnidirectional characteristic for all frequencies of the audible spectrum is provided. On the other hand, if a gamma value of zero is selected (i.e. the second extreme or second endpoint of the range of gamma values) a hearing aid output signal that has a directional characteristic for all frequencies of the audible spectrum is provided.

According to specific variations of the present embodiment, the gamma parameter is restricted to be within a range of say 1 and 0.001 or within a range of say 1 and 0.03. One advantage of these more narrow ranges is that the amplification of microphone noise in the very low frequency range is attenuated because the omnidirectional signal will dominate the directional signal in this very low frequency range. However, according to yet other alternative embodiments the relative weighting of the omnidirectional and directional signal may be carried out in other ways that the one given in equation (3), as will be obvious for the skilled person.

For gamma values between the above mentioned extreme values (which in the following may also be denoted end-points) a mix of the omnidirectional and directional signals will result, where the amount of mixing will vary across frequency due to the difference in frequency response between the omnidirectional signal and the directional signal. This constitutes a specific advantage of the present invention because it provides a frequency dependent beamforming that only requires broadband mixing as controlled by the broadband gamma parameter and without requiring filterbanks (that introduces a significant delay) in the signal path.

Furthermore, by refraining from low frequency gain restoration of the directional signal before the combiner 206, the resulting processing delay may be reduced compared to the situation with low frequency gain restoration of the directional signal which requires that a delay is added to the omni directional signal in order maintain the phase relationship between the two signals.

The intermediate beamformed signal at the output of combiner 206 is provided to the minimum phase filter 207. The filter coefficients for the operation of the minimum phase filter 207 are provided by digital signal processor (DSP) 209.

According to the present embodiment the DSP 209 analyses the microphone signals provided by the two microphones 201-*a* and 201-*b* in order to provide a target gain that is adapted to at least one of suppressing noise, customizing the sound to a user preference and alleviating a hearing deficit of an individual wearing the hearing aid system. However according to other embodiments, the DSP 209 may additionally or alternatively analyse other signals such as the omnidirectional signal from the combiner 203-*b*, the directional signal from the combiner 203-*a* and the intermediate beamformed signal from the combiner 206.

The hearing aid 200 illustrated in FIG. 2 provides a low delay beamformer that is especially advantageous with respect to the minimum signal processing delay it induces as will be explained in the following.

The low delay beam former of the present invention differs from prior art beam formers Such as the one given in FIG. 1 at least in that the low-delay beam former has incorporated all necessary filter functions in the minimum phase filter 207 which is positioned downstream of the combiner 206, whereby the resulting delay is significantly reduced compared to the hearing aid 100 in FIG. 1 wherein a significant delay results when adding the individual delays provided by both the directional FIR filters 102-*a* and 102-*b* as well as by the subsequent general FIR filter 104.

According to the present embodiment the calculation of the resulting hearing aid gain, to be applied by the minimum phase filter 207, will take into account that a low frequency boost, i.e. an additional amplification of the lower frequencies is generally required because the beamforming involves a directional signal that is formed by subtracting one microphone signal from the other and a consequence hereof is that the directional signal will exhibit a decrease in magnitude with decreasing frequency.

Thus the approach of the present invention is to combine a low frequency boost gain and the frequency dependent target gain in order to provide the resulting hearing aid gain to be applied by the minimum phase filter 207, which is positioned downstream of the combiner 206. This is an efficient approach, that avoids unnecessary gain adjustments compared to an approach of the prior art where a low frequency boost gain is initially applied to the directional signal and then subsequently (after the beamforming) a high frequency boost gain is applied (for the majority of persons suffering from a high frequency hearing loss).

It is a particular insight of the inventors that this approach according to the invention is particularly advantageous for the plurality of hearing aid users that suffer from a larger hearing loss in the high frequency range than in the low frequency range and therefore need a gain with a relatively strong frequency dependence, which translates into a correspondingly high group delay when such a frequency dependent gain is to be applied by a broadband filter, such as e.g. the minimum phase filter 207 of the present invention. Thus by incorporating the low frequency boost gain and the target gain the resulting hearing aid gain to be applied by the minimum phase filter 207 will, for the majority of persons suffering from a high frequency hearing loss, have a relatively weaker frequency dependence which translates into a shorter minimum phase filter 209 and hereby also lower group delay.

It is a further specific advantage of the present invention that a lower group delay leads to less sound artefacts arising from e.g. mixing of hearing aid sound and directly transmitted ambient sound in the ear canal, due to the so called comb filter effect. However, it is noted that the bone conducted sound from the users own voice may also interfere with the directly transmitted ambient sound and with the hearing aid sound and hereby also creating a comb like filter effect.

In this context it is noted that low delay systems are generally especially advantageous for hearing aids with so called open fittings, i.e. hearing aids where sound can enter the ear directly despite the presence of a hearing aid in the ear canal, as one example a hearing aid with a large vent may be denoted a hearing aid with an open fitting. A significant issue with open fittings is the comb filter effect, i.e. destructive interference between direct sound entering the ear (e.g. through the vent) and the sound processed (and hereby delayed) and subsequently provided by the hearing aid. The characteristics of this destructive interference is dependent on the delays and gains introduced by the hearing aid sound processing and may generally be relieved by low delay processing.

Additionally, hearing aids with open fittings are not really suited to provide a significant gain in the low frequency because a significant part of the low frequency sound provided by the hearing aid disappears into the environment through e.g. the vent. Therefore, open fittings are primarily useful to compensate high frequency hearing losses. This concurs with the low delay hearing aids described above which are especially suited to compensate hearing loss in the high-frequency range.

Additionally, the difference in frequency response between the omnidirectional and the directional signals is used to provide a beamformed signal with omnidirectional characteristics at low frequencies while having directional characteristics at higher frequencies, and for fading between the two characteristics as a function of frequency, i.e. determining the frequency ranges where either of the two characteristics are dominating by varying the value of the broadband (i.e. frequency independent) gamma parameter.

Thus, the inventors have found that the frequency independent gamma may advantageously be adapted in order to provide e.g. suppression of noise while also providing spatial cues, such as pinna cues. According to an embodiment this may be carried out using at least one of an energy minimization and sound scene classification, but other methods may also be used.

Figure 3:
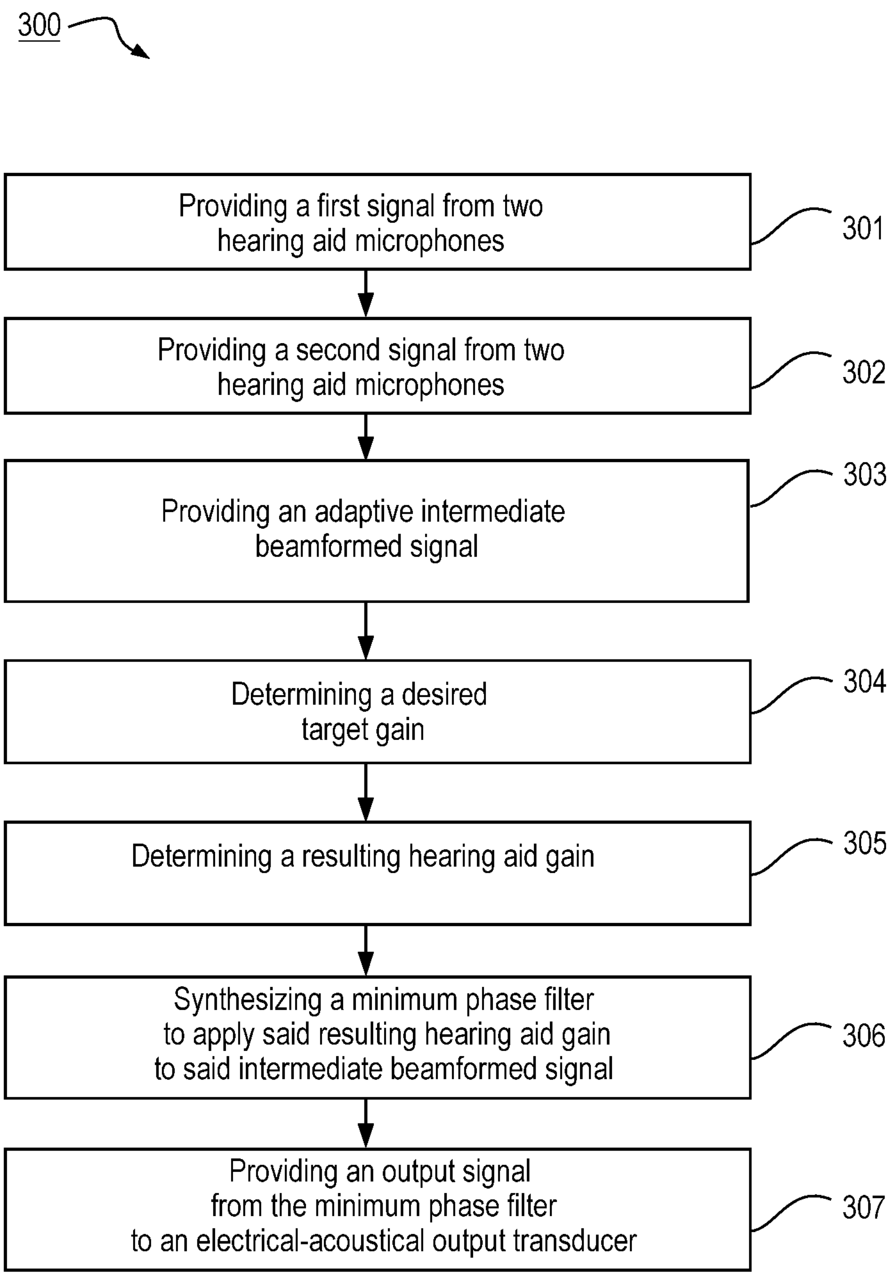
FIG. 3 illustrates highly schematically a method according to an embodiment of the invention.

Reference is now given to FIG. 3, which illustrates a method 300 of operating a hearing aid (e.g. as illustrated in FIG. 2) to provide low delay beamforming, according to an embodiment of the invention.

In a first step 301, a first signal is provided by adding a first and a second microphone signal provided from the first and the second microphones (201-*a*, 201-*b*) respectively whereby an omnidirectional signal is provided.

However, according to a specific variation only a single microphone signal is used to provide said first (omnidirectional) signal and according to an even more specific variation this variation is selected in case wind noise is detected.

In a second step 302, a second signal, that is different from the first signal, is provided by combining a third and a fourth microphone signal provided from the first and the second microphones (201-*a*, 201-*b*) respectively. According to the present embodiment the second signal is provided by subtracting one of the microphone signals from the other microphone signal whereby a directional signal is provided.

According to a variation broadband matching of the microphone signals from the microphones 201-*a* and 201-*b* is carried out.

According to various embodiments, application of a delay to at least one of said microphone signals is carried out, whereby the omnidirectional and bidirectional signals may be replaced by other types of directional signals such as the various forms of cardioids.

It is noted that dependent on whether a delay is applied to any of said first, second, third and fourth microphone signals, then some of these signals may be identical.

In a third step 303, an intermediate beamformed signal is provided by linearly combining said first and second signals using a frequency independent (i.e. broadband) adaptive parameter (gamma) to weight said first and said second signal.

In a fourth step 304, a desired target gain is determined in order to provide at least one of: alleviating a hearing deficit of a user, suppressing noise and customizing the sound to at least one of a user preference and a sound environment.

In a fifth step 305 a resulting hearing aid gain is determined in order to be applied to the intermediate beamformed signal based on the desired target gain and based on the value of the adaptive parameter. Hereby the impact from the selected value of the adaptive parameter (gamma), on the frequency response of the intermediate beamformed signal, is also compensated.

In a sixth step 306, the minimum phase filter 207 is synthesized in order to apply said resulting hearing aid gain to said intermediate beamformed signal in order to provide a hearing aid output signal that has been processed with the desired target gain.

Finally, in a seventh step 307, the output signal from the minimum phase filter 207 is provided to the electrical-acoustical output receiver 208 wherefrom the output signal is provided as sound.

Methods for synthesizing filter coefficients for a digital filter in order to adapt the digital filter to be of minimum phase and to provide a frequency dependent target gain /H(ω)/ are known in the prior art. However, reference is now made to FIG. 4, which illustrates a prior art method 400 for carrying out said synthetisation.

In a first step, at least one input signal is analysed in order to provide a frequency dependent target gain /H(ω)/.

In a second step, the real cepstrum $c_x(n)$ of the complex cepstrum x(n) of the desired frequency dependent target gain /H(ω)/ is obtained by taking the inverse Fourier transformation (processing block 402) of the logarithm (processing block 401) of the frequency dependent target gain /H(ω)/. Generally, the relation between the real cepstrum $c_x(n)$, the complex cepstrum, the frequency dependent target gain and the filter transfer function H(ω) is given by:

$$x(n) = F^{-1}[\log(H(\omega))](1) = F^{-1}[\log(/H(\omega)/) + i\arg(H(\omega)))] = F^{-1}[\log(/H(\omega)/)] + F^{-1}[i\arg(H(\omega)))] \quad (4)$$

and consequently the real cepstrum $c_x(n)$ is given by:

$$c_x(n)=F^{-1}[\log(/H(\omega)/))]. \quad (5)$$

In a third step a window function is applied by processing block 403 to the real cepstrum of the frequency dependent target gain /H(ω)/, whereby the complex cepstrum $x_{min}(n)$ representing the desired minimum phase filter impulse response is provided:

$$x_{min}(n)=l_{min}(n)c_x(n) \quad (6)$$

Thus the window function $l_{min}$ is the unique function that can reconstruct the minimum phase complex cepstrum from the real cepstrum representing the frequency dependent target gain.

The discrete and finite window function $l_{min}$ is given as:

$$l_{min}(n) = 2 - \delta(n) - \delta\left(\frac{N}{2} - n\right) \forall\ 0 \le n \le \frac{N}{2} l_{min}(n) = 0 \forall\ \frac{N}{2} < n < N - 1, , \quad (7)$$

and $$l_{min}(n) = 2 - \delta(n) - \delta\left(\frac{N}{2} - n\right) \forall\ 0 \le n \le \frac{N}{2} l_{min}(n) = 0 \forall\ \frac{N}{2} < n < N - 1,$$

Wherein N is the length of the inverse Fourier transform used to provide the real cepstrum, N/2 is the Nyquist frequency, δ(n) is the Kronecker delta function and n is the cepstrum variable.

In a fourth step carried out by the processing block 404 a Fourier transformation is applied to the provided complex cepstrum $x_{min}(n)$ representing the desired minimum phase filter impulse response and hereby providing a logarithmic filter transfer function that is minimum phase.

In a fifth step carried out by the processing block 405 a filter transfer function $H_{min}(\omega)$ that is minimum phase is provided by applying a complex exponential function to the provided logarithmic filter transfer function.

In a sixth step carried out by the processing block 406 an inverse Fourier transformation is applied to the filter transfer function that is minimum phase and hereby the desired minimum phase filter impulse response $h_{min}(n)$ is provided, whereby the filter coefficients that will make the digital filter minimum phase and provide the desired frequency dependent target can be determined.

Figure 4:
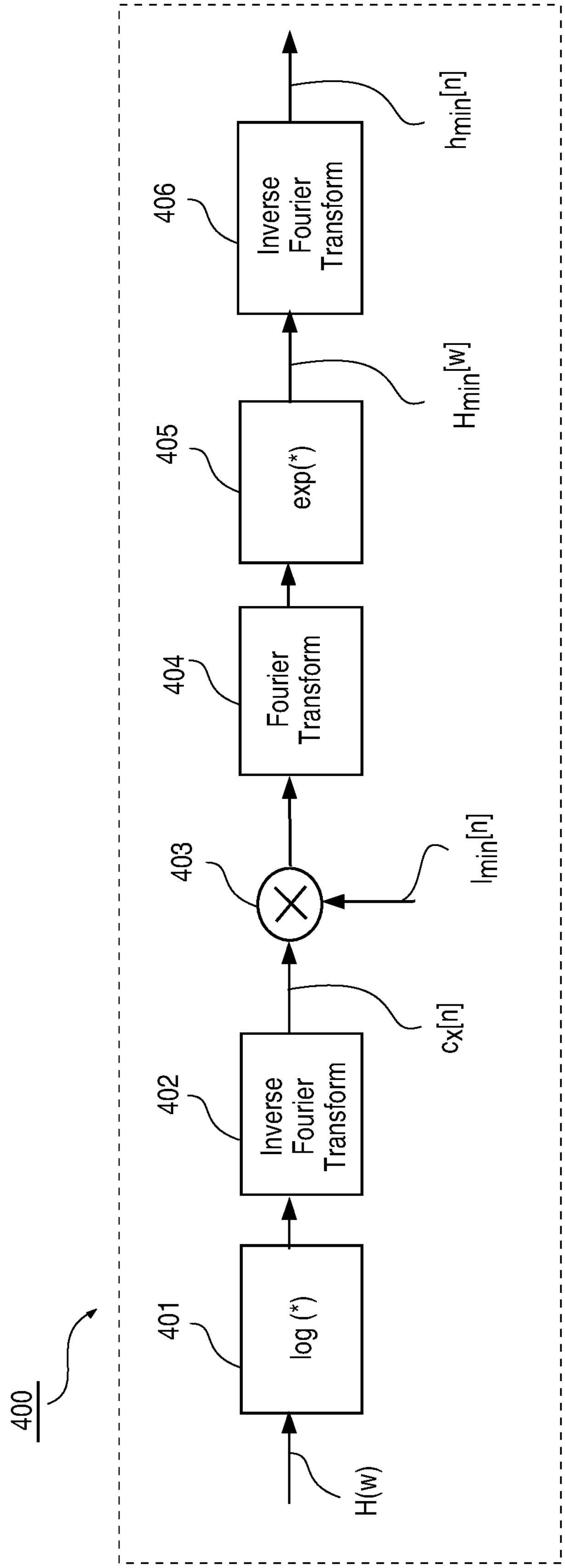
FIG. 4 illustrates highly schematically a minimum phase filter according to the prior art.

In summary FIG. 4 illustrates the calculation strategy presented in Eq. (4) through (7), wherein the input is the desired frequency dependent target gain function /H(ω)/ and the output is the corresponding minimum phase filter coefficients.

It is generally noted that even though many features of the present invention are disclosed in embodiments comprising other features then this does not imply that these features by necessity need to be combined.

As one obvious example the various beamformer configurations and corresponding methods are independent of the specific method for synthesizing filter coefficients for a digital filter in order to adapt the digital filter to be of minimum phase and to provide a desired frequency dependent target gain. As one alternative the synthetization may be carried out based on Hilbert transforms.

As another example, the various beamformer configurations and corresponding methods may or may not comprise the feature of delaying at least one of the (at least) two microphone signals used for the beamforming. Furthermore, the delay may or may not be a fractional delay (i.e. the delay may also be equal to an integer of the sampling period).

Likewise, the various beamformer configurations and corresponding methods are generally independent on the specific type of directional signal that is used as input to the adaptive weighting of the directional signal and an omnidirectional signal. Thus the directional signal may be a bidirectional signal or may be a hyper-cardioid just to mention two examples.

The various beamformer configurations and corresponding methods are also independent on whether the omnidirectional signal is derived from one or two (or more) microphone signals and independent on whether at least one of said microphone signals have been delayed. One specific advantage of using only one microphone for the omnidirectional signal is that it enables a simple manner to provide improved wind noise suppression by selecting the microphone that is less impacted by the wind noise.

Likewise said adaptive weighting may be carried out in a variety of different ways all of which will be obvious for a person skilled in the art. One obvious variation of the present embodiment is to carry out the adaptive weighting of the omnidirectional signal and the directional signal as given below:

$$iBF=omni+\gamma*dir \quad (8)$$

and according to another variation the gamma parameter may be implemented as a frequency dependent filter, which will add a delay that for some situations may be acceptable.

Additionally, the beamforming need not be based on a combination of an omnidirectional and a directional signal. As one alternative two opposing cardioids (i.e. cardioids pointing in opposite directions) may be used despite this solution generally being considered less advantageous because the lack of difference in frequency response makes it difficult to provide low delay beamforming (i.e. broadband beamforming, because filterbank based beamforming introduces unacceptable high delays) wherein the beamformed signal has omnidirectional characteristics in the low frequency range and directional characteristics in the high frequency range.

However, it is noted that beamforming based on a combination of an omnidirectional and a directional signal may also include e.g. a system based on two opposing cardioids and an omnidirectional signal, wherein the two opposing cardioids are used to enable an adaptive control of the directional signal, such that a plurality of directional signal forms may be selected dependent on e.g. the present sound environment. Furthermore, it is noted that such a system may still be implemented using only 2 microphones.

Figure 5:
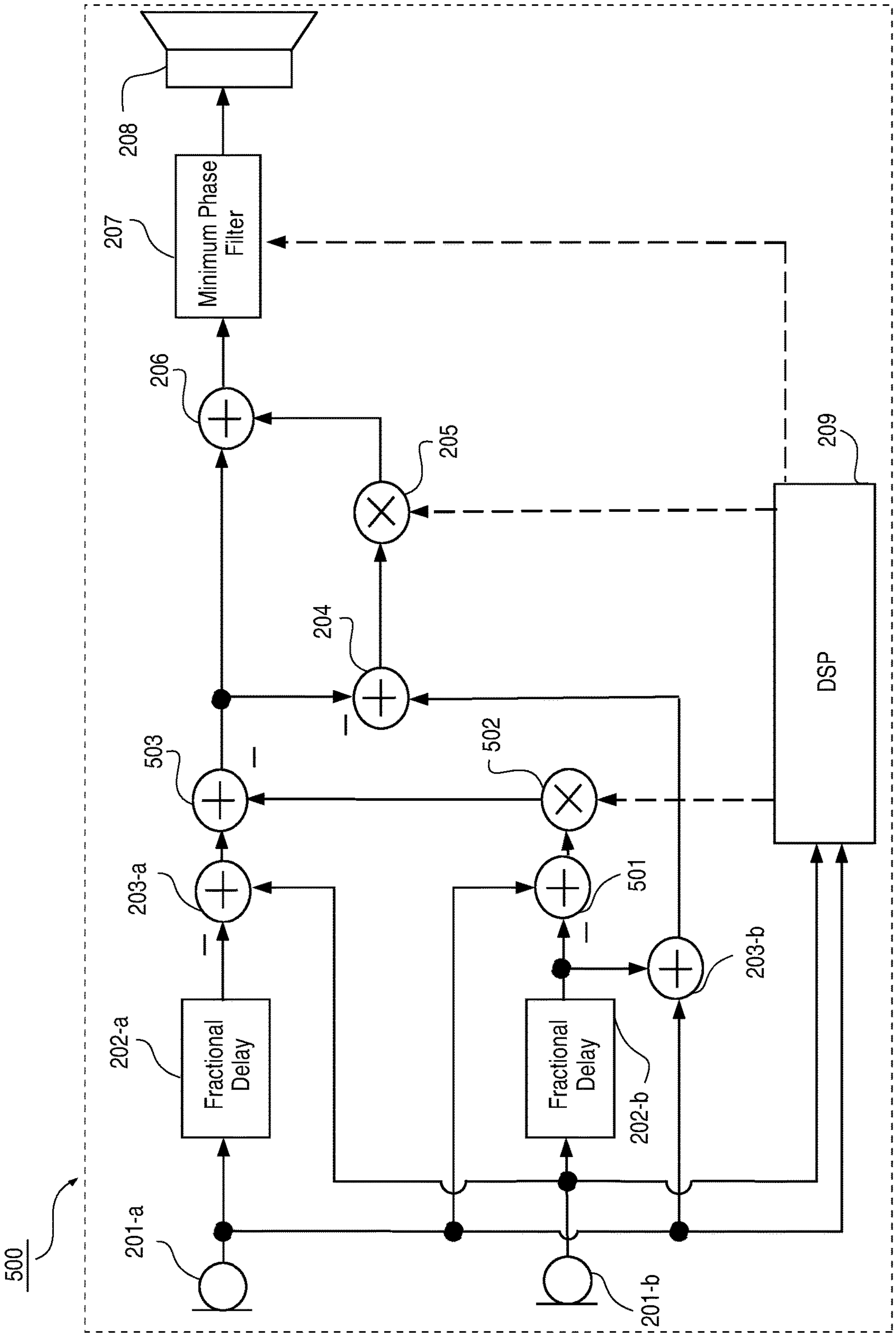
FIG. 5 illustrates highly schematically a hearing aid according to an embodiment of the invention.

Reference is therefore now given to FIG. 5, which illustrates such a hearing aid 500 based on two opposing cardioids enabling an adaptive control of the directional signal according to an embodiment of the invention. FIG. 5 is similar to FIG. 2 and consequently elements in FIG. 5 that provide a functionality similar to the functionality of FIG. 2 will have the same reference numbers in FIG. 5.

The hearing aid 500 comprises an additional combiner 501 that provides the same functionality as the combiner 203-*a* except in that combiner 501 provides a first directional signal with a different orientation than a second directional signal provided by the combiner 203-*a*. Additionally the hearing aid 500 comprises a multiplier 502 that enables weighting of the first directional signal provided by the combiner 501 relative to the second directional signal provided by the combiner 203-*a* based on an adaptive parameter β that is controlled by the DSP 209. Finally, the hearing aid 500 comprises a combiner 503 that combines the first directional signal and the second directional signal and hereby provides a third directional signal that subsequently is combined with an omni-signal as already discussed with reference to FIG. 2.

Hereby the third directional signal as output from the combiner 503 can be expressed as given below in equation (9):

$$dir=(x_{front}(t)-x_{rear}(t+\tau_{rear}))-\beta*(x_{rear}(t)-x_{front}(t+\tau_{rear})) \quad (9)$$

wherein $x_{front}$ (t) and $x_{rear}$ (t) represent the microphone signals from the microphones 201-*b* and 201-*a* respectively and wherein $\tau_{rear}$ represents the acoustic microphone distance which is added by the delay units 202-*a* and 202-*b*.

According to variations of the FIG. 5 embodiment the delays of the delay units 202-*a* and 202-*b* may be any fraction of the acoustic microphone distance.

According to further variations of the FIG. 5 embodiment the delay units 202-*a* and 202-*b* don't provide the same delay. As one example of such a variation one delay unit is configured with a delay that provides a hyper-cardioid, while the other delay unit is configured with delay that provides an anti-cardioid.

Finally, it is noted that according to variations of the FIG. 2 and FIG. 5 embodiments an additional separate delay unit is included for creating the omni-signal as provided by the combiner 203-*b*. As for the other delay units the delay provided by this additional separate delay unit may be between zero and a full acoustic microphone distance.

It is noted that the method steps carried out by the hearing aid according to FIG. 5 can be formulated as follows:

provide a first directional signal (output signal from 203-*a*) by combining a first and a second microphone signal provided from the first and the second microphones 201-*a* and 201-*b* respectively;

provide a second directional signal (output signal from 501) that is different from the first directional signal by combining a third and a fourth microphone signal provided from the first and the second microphones (201-*a* and 201-*b*) respectively;

use the calculation unit 209 to provide an intermediate beamformed signal by linearly combining, in the first combiner 503, said first and second directional signals using a first adaptive parameter 502 to provide a relative weighting of said first and second directional signals;

use at least one of said first and second microphone signals to provide an intermediate omni-directional signal;

use the calculation unit 209 to provide a resulting beamformed signal (output signal from 206) by linearly combining, in the second combiner (204, 205 and 206), said intermediate beamformed signal and said intermediate omni-directional signal using a second adaptive parameter 205 to provide a relative weighting of said intermediate beamformed signal and said intermediate omni-directional signal;

use the calculation unit 209 to determine a target gain adapted to provide at least one of: alleviating a hearing deficit of a user, suppressing noise and customizing the sound to at least one of a user preference and a sound environment;

use the calculation unit to determine a resulting hearing aid gain to be applied to the resulting beamformed signal based on the target gain and based on the values of the adaptive parameters (205 and 502);

use the calculation unit 209 to synthesize a low-latency filter 207, such as a minimum phase filter, to apply said resulting hearing aid gain to said resulting beamformed signal in order to provide a hearing aid output signal as input to the electrical-acoustical output receiver 208.

However it is noted that these method steps can also be carried out by hearing aids configured a bit differently based on minor variations that will be obvious for the skilled person.

According to a variation of the FIG. 5 embodiment both the first and the second microphone signal is split by a 2-channel filterbank (i.e. a split filterbank).

Hereby an additional means to e.g. control the frequency response of the resulting beamformed signal is provided.

According to another embodiment, the 2-channel filterbank is a warped filter bank, which is advantageous if the low latency filter is likewise warped. Additionally, a warped 2-channel filterbank provides an advantageous method to control a cross-over frequency based on only varying a single parameter in the form of the warping factor of a warped delay-line given the sampling rate and the desired cross-over frequency between the low and high frequency ranges of the 2-channel filterbank. Furthermore the warped 2-channel filter according to the invention offers perfect reconstruction, i.e. ensures that no signal information is lost due to the filtering.

This type of 2-channel filterbank is capable of being close to transparent with respect to delay, which of course is an important feature if the 2-channel filterbank is not required for all types of hearing loss or for all types of hearing aid earpieces. Thus by adjusting (only) the warping factor the cross-over frequency can be moved to zero or to the Nyquist frequency removing the bandsplit effect and allow for smooth inclusion of the 2-channel filterbank in the hearing aid.

However, a warped 2-channel filterbank is also advantageous compared to a not warped 2-channel filterbank because warped filters generally require less chip space due to the efficient processing where relatively few calculations are required.

In an embodiment the warped 2-channel filter is configured to carry out the steps of:

- dividing the input signal into overlapping segments (i.e. windows);
- applying a FFT to each segment and hereby obtaining a time-frequency representation of the input signal (i.e. a Short Time Fourier Transform STFT);
- applying a frequency warping function to the STFT bins, making the frequency scale non-uniform or logarithmic;
- dividing the warped STFT bins into two channels (i.e. a low-frequency and a high-frequency channel), defined by the cross-over frequency and wherein the channel separation is provided by applying FIR filters (with the desired frequency response) to the STFT bins; and
- applying the inverse STFT to each channel, whereby the time-domain signals corresponding to the warped frequency bands are reconstructed.

In a variation two FIR filters with two taps can be used instead of FFTs.

In an embodiment the 2-channel filterbank has a cross-over frequency at 4 kHz or in the range between 3 and 5 KHz.

In an embodiment the desired cross-over frequency can be obtained by tuning the warping factor λ in accordance with the formula:

$$\lambda = -\frac{\tan\left(\frac{1}{2}\left(\frac{\pi}{2} - 2\pi\frac{f'_{co}}{f_s}\right)\right)}{\cos\left(\frac{\pi}{2}\right)\tan\left(\frac{1}{2}\left(\frac{\pi}{2} - 2\pi\frac{f'_{co}}{f_s}\right)\right) - \sin\left(\frac{\pi}{2}\right)} = \tan\left(\frac{\pi}{4} - \pi\frac{f'_{co}}{f_s}\right)$$

wherein $f_s$ is the sampling frequency of the digital signal and wherein $f'_{co}$ is the cross-over frequency.

For wind noise reduction or when a microphone fails, it is advantageous to be able to quickly switch to a single microphone output. As a single microphone has an (approximately) flat frequency response and the intermediate beamformed signal has its typical high-pass characteristic, it can be problematic when changing from a directional signal to an omni signal, because this would result in a sudden boost in the low frequencies, after which the gain compensation would adapt too slowly. Therefore, according to an embodiment, the single microphone output is high-pass filtered to mimic the frequency response of the intermediate beamformed signal. This can potentially be done in separate channels (e.g., for wind noise reduction).

Other modifications and variations of the structures and procedures will be evident to those skilled in the art.

The invention claimed is:

1. A hearing aid comprising a first microphone, a second microphone, a calculation unit, a first and a second combiner, a low-latency filter and an electrical-acoustical output receiver, wherein the hearing aid is configured to:

- provide a first directional signal by combining a first and a second microphone signal provided from the first and the second microphones respectively;
- provide a second directional signal that is different from the first directional signal by combining a third and a fourth microphone signal provided from the first and the second microphones respectively;
- use the calculation unit to provide an intermediate beamformed signal by linearly combining, in the first combiner, said first and second directional signals using a first adaptive parameter to provide a relative weighting of said first and second directional signals;
- use at least one of said first and second microphone signals to provide an intermediate omni-directional signal;
- use the calculation unit to provide a resulting beamformed signal by linearly combining, in the second combiner, said intermediate beamformed signal and said intermediate omni-directional signal using a second adaptive parameter to provide a relative weighting of said intermediate beamformed signal and said intermediate omni-directional signal;
- use the calculation unit to determine a target gain adapted to provide at least one of: alleviating a hearing deficit of a user, suppressing noise and customizing the sound to at least one of a user preference and a sound environment;
- use the calculation unit to determine a resulting hearing aid gain to be applied to the resulting beamformed signal based on the target gain and based on the values of the adaptive parameters;
- use the calculation unit to synthesize the low-latency filter to apply said resulting hearing aid gain to said resulting beamformed signal in order to provide a hearing aid output signal as input to the electrical-acoustical output receiver.

2. The hearing aid according to claim 1, comprising two 2-channel filterbanks each configured to split the signal outputs from one of said first and second microphones.

3. The hearing aid according to claim 1, configured to provide a single microphone output signal as said resulting beamformed signal, in response to a detection of at least one of: a wind noise level above a given threshold and a defect microphone.

4. The hearing aid according to claim 3, wherein said single microphone output signal is provided by selecting only one of said first and second microphone signals to provide the intermediate omni-directional signal; and

- by linearly combining, in the second combiner, said intermediate beamformed signal and said intermediate omni-directional signal using said second adaptive parameter to give zero weight to said intermediate beamformed signal.

5. The hearing aid according to claim 4, wherein said single microphone output signal is high pass filtered.

6. The hearing aid according to claim 5, wherein said high pass filtered single microphone output signal is obtained using a cascade of two Thieran all-pass filters configured in accordance with the formula:

$$\mathrm{Omni}(t)_{HighPass}=\mathrm{mic}(t)-\mathrm{mic}(t-2\tau)$$

wherein $\mathrm{Omni(t)}_{HighPass}$ represents said high pass filtered single microphone output signal, wherein mic(t) represents said single microphone output signal and wherein $\tau$ represents a time delay.

7. The hearing aid according to claim 6, wherein Thieran filter all-pass filters are also used as delay filters to provide said first and second directional signals.

8. The hearing aid according to claim 6, wherein the time delay is a maximal acoustic delay between the first and second hearing aid microphones.

9. The hearing aid according to claim 1, wherein said intermediate omni-directional signal is an omni-directional delay-and-sum signal configured in accordance with the formula:

$$DSB(t)=\mathrm{mic}_1(t)+\mathrm{mic}_2(r-\tau)$$

wherein DSB(t) is an omni-directional delay-and-sum signal, wherein $\mathrm{mic}_1(t)$ represents the signal of a first microphone signal of the hearing aid and $\mathrm{mic}_2(t)$ represents the signal of a second microphone signal of the hearing aid, and t is the maximal acoustic delay between the first and second microphone signals.

10. The hearing aid according to claim 1, wherein the second adaptive parameter adapted to provide a relative weighting of said intermediate beamformed signal and said intermediate omni-directional signal can be used to tune the cross-over frequency between low-frequency omni-directional output and high-frequency directional output.

11. The hearing aid according to claim 1, wherein the value of at least one of the first and second adaptive parameter is used to adaptively control the frequency dependent directional characteristic of the hearing aid output signal.

12. The hearing aid according to claim 1, wherein the value of at least one of the first and second adaptive parameter is independent of frequency.

13. The hearing aid according to claim 1, wherein the value of at least one of the first and second adaptive parameter is determined based on at least one of energy minimization and sound scene classification.

14. The hearing aid according to claim 1, wherein the hearing aid comprises a first delay unit configured to apply a first fractional delay to at least one of the first and second microphone signals such that a frequency dependent decrease in sensitivity is alleviated for a first impinging sound direction for the first signal while a frequency dependent decrease in sensitivity for a second impinging sound direction is maintained whereby spatial cues are provided.

15. The hearing aid according to claim 1, wherein the hearing aid comprises a second delay unit configured to apply a second fractional delay to at least one of the third and fourth microphone signals in order provide a desired directional characteristic for the second signal, wherein said desired directional characteristic is selected from a group of characteristics comprising cardioid, sub-cardioid, super-cardioid, hyper-cardioid and bidirectional.

16. A method of operating a hearing aid comprising a first microphone, a second microphone, a calculation unit, a combiner, a low-latency filter and an electrical-acoustical output receiver, the method comprising the steps of:

providing a first directional signal by combining a first and a second microphone signal provided from the first and the second microphones respectively;

providing a second directional signal that is different from the first directional signal by combining a third and a fourth microphone signal provided from the first and the second microphones respectively;

using the calculation unit to provide an intermediate beamformed signal by linearly combining said first and second directional signals using a first adaptive parameter to provide a relative weighting of said first and second directional signals;

using at least one of said first and second microphone signals to provide an intermediate omni-directional signal;

using the calculation unit to provide a resulting beamformed signal by linearly combining, in the second combiner, said intermediate beamformed signal and said intermediate omni-directional signal using a second adaptive parameter to provide a relative weighting of said intermediate beamformed signal and said intermediate omni-directional signal;

using the calculation unit to determine a target gain adapted to provide at least one of: alleviating a hearing deficit of a user, suppressing noise and customizing the sound to at least one of a user preference and a sound environment;

using the calculation unit to determine a resulting hearing aid gain to be applied to the resulting beamformed signal based on the target gain and based on the value of the adaptive parameters;

using the calculation unit to synthesize the low-latency filter to apply said resulting hearing aid gain to said resulting beamformed signal in order to provide a hearing aid output signal as input to the electrical-acoustical output receiver.

17. A computer program product with instructions stored in a non-transitory computer readable medium which, when executed on a computer, perform the method of claim 16.

* * * * *